United States Patent [19]
Woodworth

[11] 3,714,498
[45] Jan. 30, 1973

[54] TELEVISION CAMERA

[75] Inventor: William H. Woodworth, China Lake, Calif.

[73] Assignee: The United States of America as represented by the Secretary of the Navy

[22] Filed: Feb. 16, 1970

[21] Appl. No.: 11,492

[52] U.S. Cl. ........................315/19, 178/7.2, 315/11, 315/20

[51] Int. Cl. ..............................................H01j 29/70

[58] Field of Search .......315/11, 20, 19, 25; 178/7.2; 330/17, 16, 15

[56] References Cited

UNITED STATES PATENTS

| | | | |
|---|---|---|---|
| 3,399,354 | 8/1968 | Sodtke | 330/17 |
| 3,262,061 | 7/1966 | Kahn | 330/17 |
| 3,486,125 | 12/1969 | Boelter | 330/17 |
| 3,201,591 | 8/1965 | Forelich | 315/19 X |
| 2,779,817 | 1/1957 | Stahl | 178/7.2 X |
| 3,399,324 | 8/1968 | Brown | 315/20 |
| 3,006,995 | 10/1961 | Fathauer | 178/7.2 |
| 3,358,184 | 12/1967 | Vitt, Jr. | 178/7.2 X |
| 3,136,848 | 6/1964 | Woodworth | 178/7.2 |

OTHER PUBLICATIONS

"Electronic Amplifier Circuits," J. M. Pettit et al., McGraw-Hill, 1961, pp. 115–118

*Primary Examiner*—Samuel Feinberg
*Assistant Examiner*—H. A. Brimiel
*Attorney*—R. S. Sciascia and Roy Miller

[57] ABSTRACT

A television camera having an electrostatic rather than electromagnetic deflection system. The camera comprises a time-base generator which supplies separate pulses to the vertical and horizontal deflection circuits, each of which has a monostable multivibrator, an integrator and a unity-gain phase inverter. The tube output is amplified by a three-stage, two-pole response per stage, amplifier.

3 Claims, 6 Drawing Figures

WILLIAM H. WOODWORTH
INVENTOR.
BY Roy Miller
Attorney

TELEVISION CAMERA

GOVERNMENT INTEREST

The invention described herein may be manufactured and used by or for the Government of the United States of America for governmental purposes without the payment of any royalties thereon or therefor.

BACKGROUND OF THE INVENTION

The invention relates to high-contrast electrostatically deflected television cameras for use with TV-guided missiles. The advantages of having electrostatic instead of electromagnetic focus and deflection are that the camera assembly diameter and weight are substantially reduced. Previously there was no available camera having electrostatic rather than electromagnetic deflection suitable for the above purpose.

DESCRIPTION OF THE PREFERRED EMBODIMENT

Figure 1:
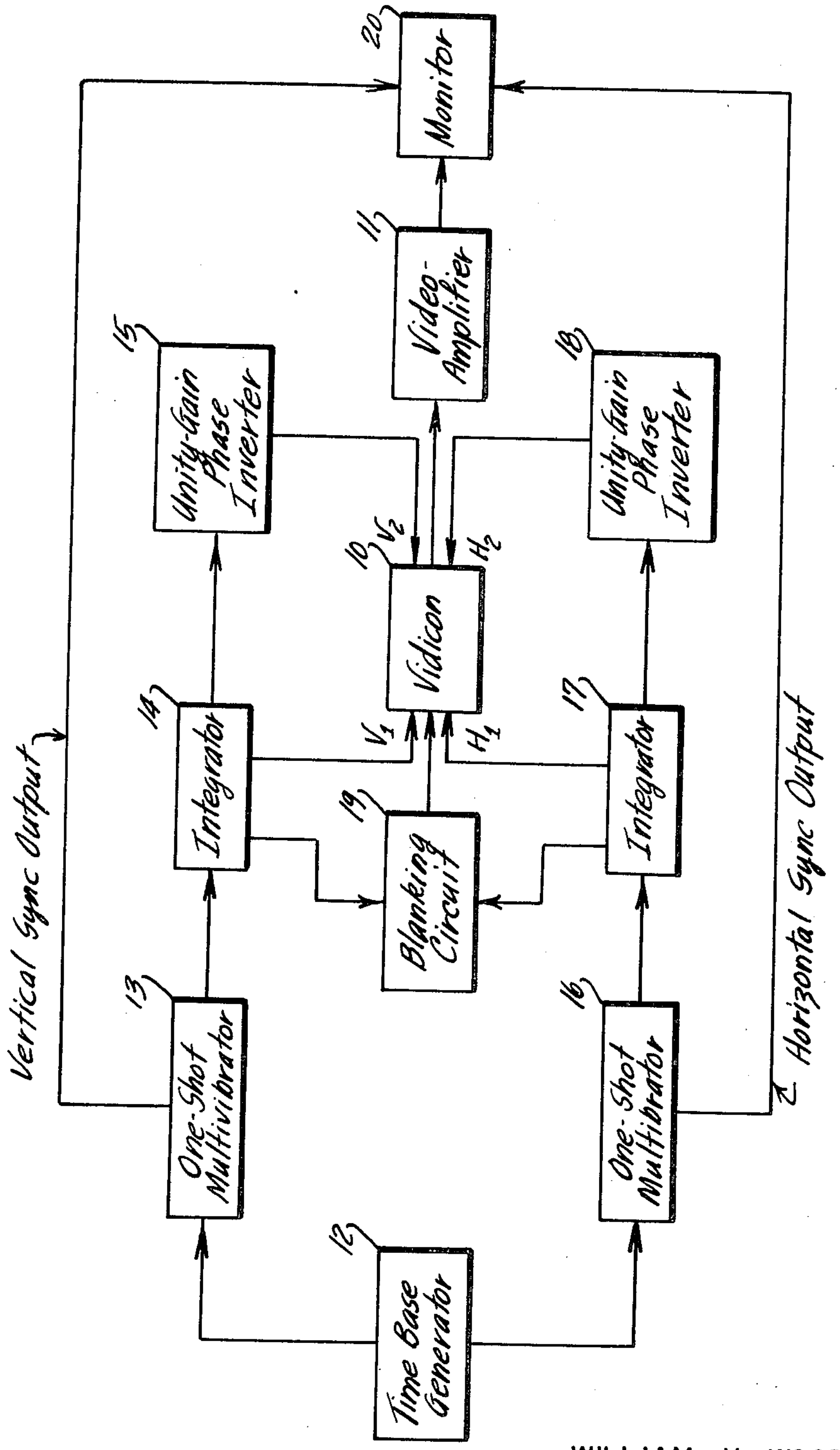
FIG. 1 is a plan view of the invention.

Referring to FIG. 1, the electrostatic television camera comprises a vidicon tube 10, video amplifier 11, and vidicon tube electron beam deflection system consisting of horizontal and vertical plate circuits. Each circuit originates at a time-base generator 12 which supplies separate enabling pulses to a one-shot multivibrator 13 and (16) in each circuit. For the vertical circuit, and likewise for the horizontal circuit, the output of the multivibrator is fed into an integrator 14 (17) and unity gain phase inverter 15 (18) which supply the deflection voltages to the plates $V_1$ and $V_2$ ($H_1$ and $H_2$). A blanking circuit 19 is provided to unblank the vidicon 10 during sweep.

The output of the vidicon 10 is fed into a video amplifier 11 where it is amplified to a suitable level for utilization by a monitor 20.

Figure 2A:
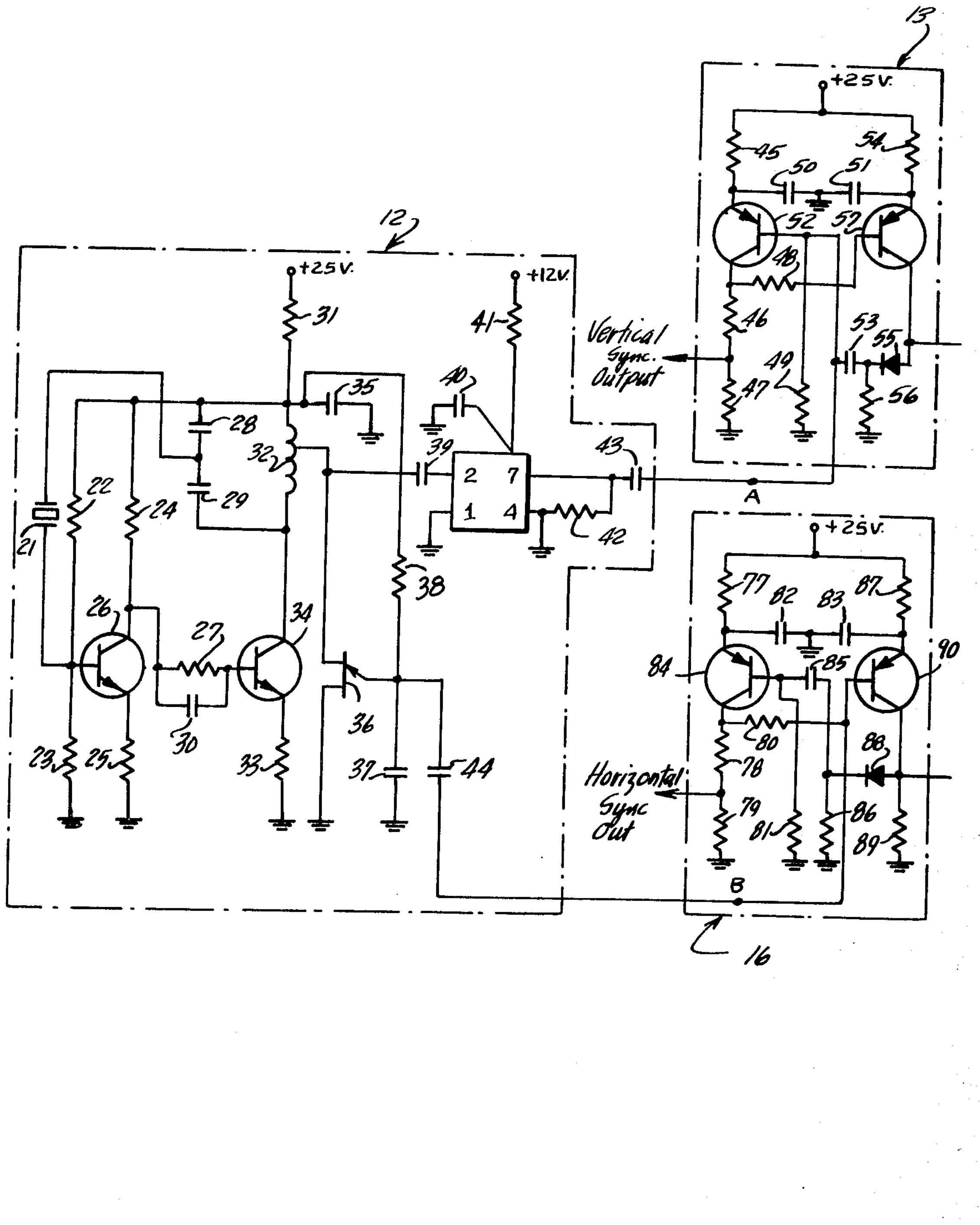
FIGS. 2*a* and *b* are schematics of the time-base generator and deflection circuit.
Figure 2B:
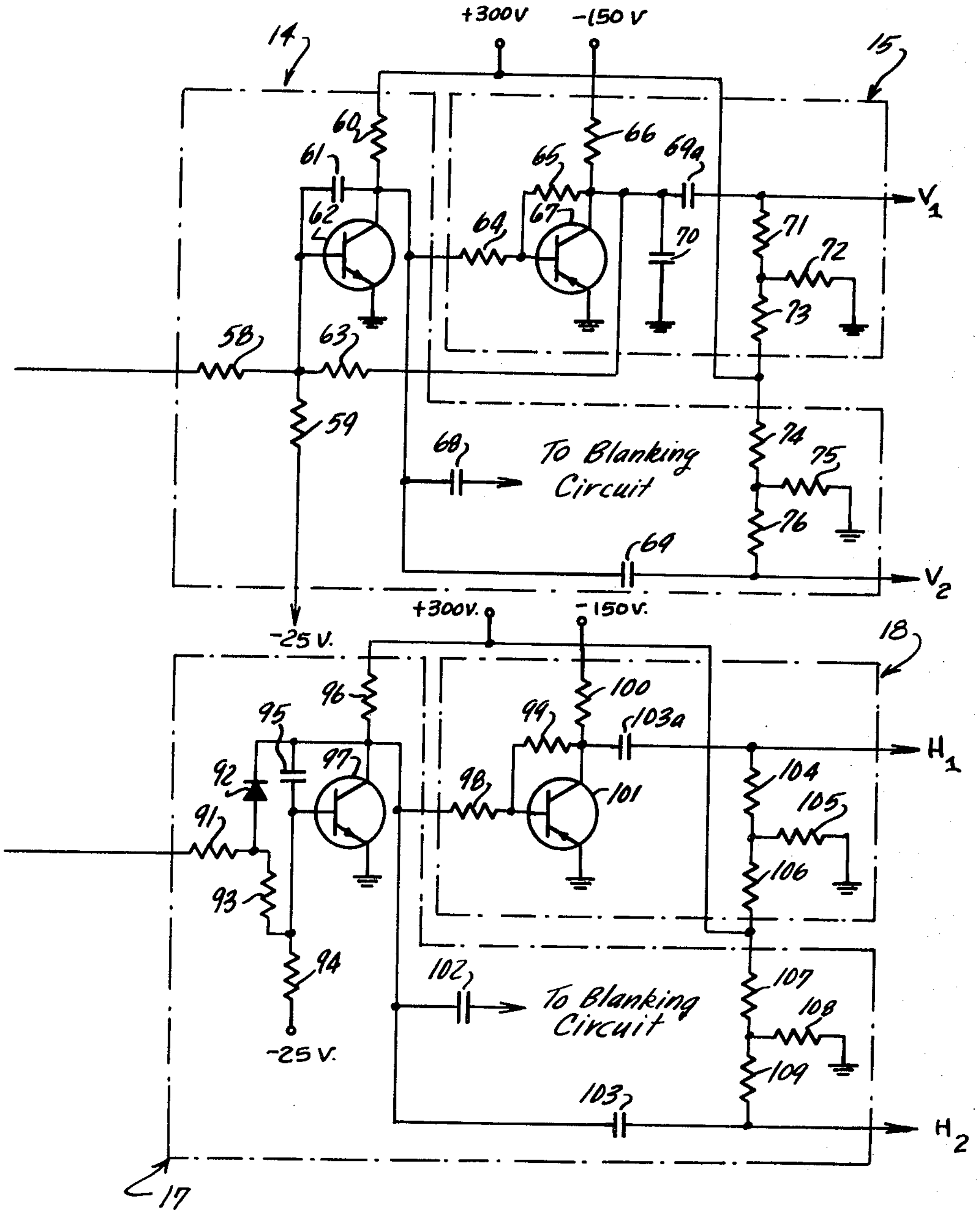

Referring to FIGS. 2*a* and *b*, the time-base generator 12 consists of a two-transistor 31.5 kilocycle crystal oscillator driving an Incremag count-down which furnishes 60 cps pulses to the vertical circuit, and a double-base diode circuit which furnishes 15.75 Kc pulses to the horizontal circuit. These two sets of pulses trigger the one-shot multivibrators 13 and 16 whose "on" times are approximately the retrace or blanking intervals. The multivibrator outputs are used to reset the integrators 14 and 17 and provide synchronized output to the monitor 20.

The integrators 14 and 17 have constant input current, except during retrace, thus providing a low impedance voltage saw-tooth output. The phase inverters 15 and 18 driving the opposite plates of each circuit are unit-gain, low output impedance amplifiers.

Figure 3:
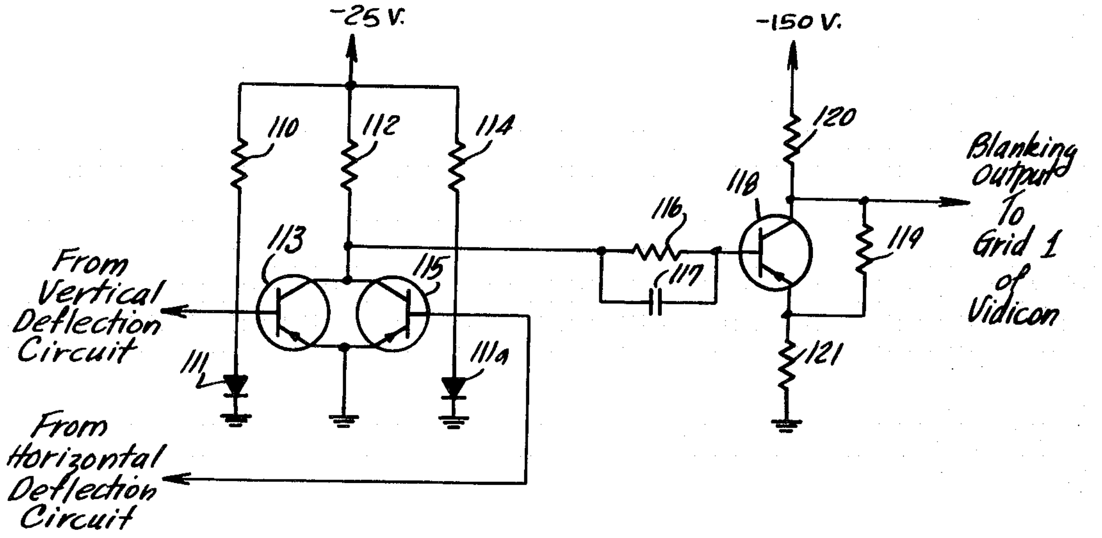
FIG. 3 is a schematic of the blanking circuit.

Referring to FIG. 3, the blanking circuit 19 unblanks the vidicon 10 during sweep so that failure of either vertical or horizontal sweep results in continued blanking and precludes damage to the vidicon. The unblanking signals are obtained by differentiating the horizontal and vertical sweep voltages and using these signals to hold transistors 113 and 115 off during sweep. Transistor 118 is thus on providing a fixed low voltage at Grid 1 which normally biases the vidicon 10. At the beginning of retrace the derivative changes sign, transistor 113 and transistor 115 turn on, transistor 118 turns off, and the vidicon 10 is blanked until sweep begins again. Transistor 113 and transistor 115 are biased so that failure of either sweep results in continued blanking.

Figure 4:
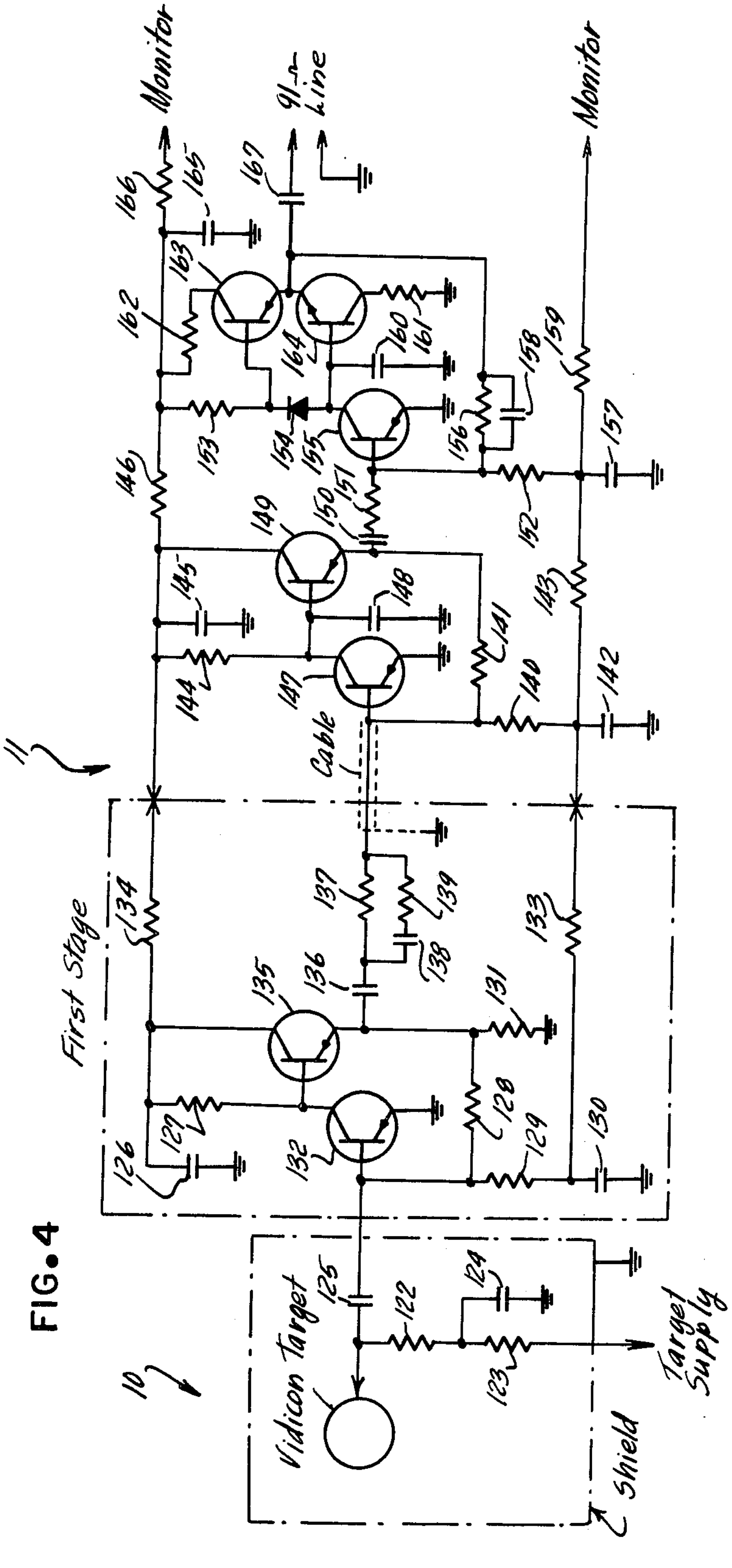
FIG. 4 is a schematic of the video amplifier.

Referring to FIG. 4, the first stage of the video amplifier 11, for noise considerations, is designed for a two-pole response with both poles on the real axis. The remaining two stages have maximally flat two-pole responses.

Noise has been further minimized in the first stage by maximizing all resistance shunting the input, operating at the minimum shot noise value of emitter current, and using a high frequency PNP germanium transistor for transistor 132.

Figure 5:
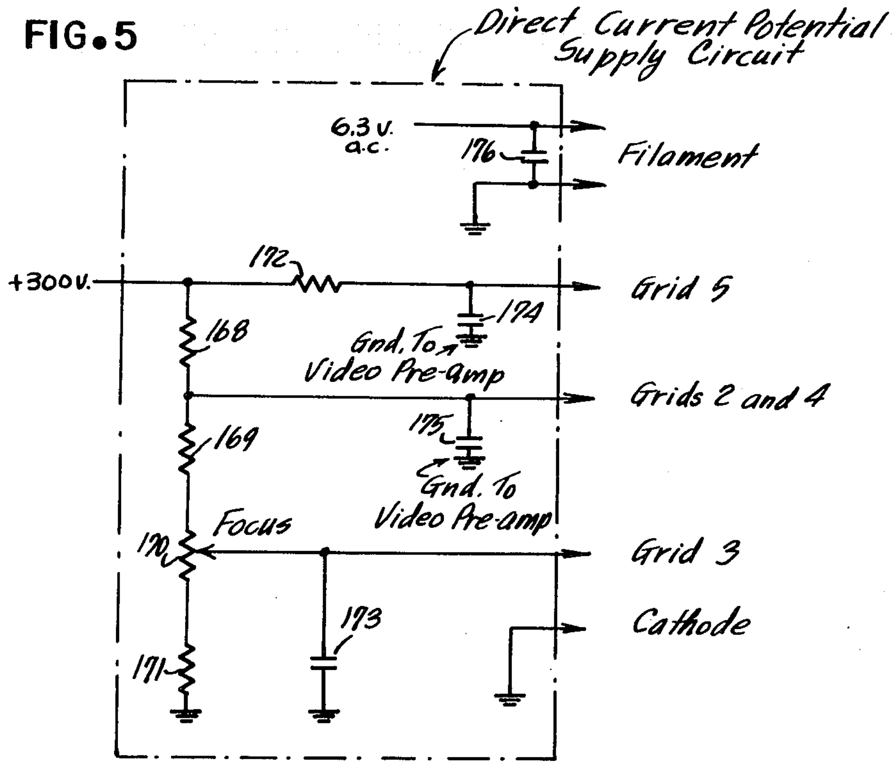
FIG. 5 is a schematic of the direct current potential supply.

Referring to FIG. 5, the direct current potential supply circuit provides the proper potentials on tube Grids 2–5. The deflection plates $V_1$ and $V_2$, and $H_1$ and $H_2$ can be operated directly at the high voltage supply level with minimum astigmatism; and, when the coupling time constants to the deflection plates are all made equal focus is maintained and no noticeable astigmatic transient occurs as the high voltage supply is changed rapidly between 260 – 340 volts.

The following list of components is included by way of example of the type and value of circuit components in the preferred embodiment of the invention.

| Symbol | Component | Type of Value |
|---|---|---|
| 21 | Piezoelectric Crystal | 31.5 Kilocycle |
| 22 | Resistor | 47K ohm |
| 23 | Resistor | 5.1K ohm |
| 24 | Resistor | 3.3K ohm |
| 25 | Resistor | 1K ohm |
| 26 | Transistor | 2N1308 |
| 27 | Resistor | 56K ohm |
| 28 | Capacitor | 0.068 microfarad |
| 29 | Capacitor | 0.015 microfarad |
| 30 | Capacitor | 0.047 microfarad |
| 31 | Resistor | 120 ohm |
| 32 | Coil | 2 millihenry |
| 33 | Resistor | 510 ohm |
| 34 | Transistor | 2N697 |
| 35 | Capacitor | 68 microfarad |
| 36 | Double Base Diode | 2N492 |
| 37 | Capacitor | 1 microfarad |
| 38 | Resistor | 10K ohm (approximately) |
| 39 | Capacitor | 110 microfarad/15 volt |
| 40 | Capacitor | 0.0068 microfarad |
| 41 | Resistor | 10 ohm |
| 42 | Resistor | 220 ohm |
| 43 | Capacitor | 0.0015 microfarad |
| 44 | Capacitor | 0.02 microfarad |
| 45 | Resistor | 180 ohm |
| 46 | Resistor | 1K ohm |
| 47 | Resistor | 33K ohm |
| 48 | Resistor | 7.5K ohm |
| 49 | Resistor | 15K ohm |
| 50 | Capacitor | 68 microfarad/30 volt |
| 51 | Capacitor | 110 microfarad/30 volt |
| 52 | Transistor | 2N1309 |
| 53 | Capacitor | 0.15 microfarad |
| 54 | Resistor | 1K ohm |
| 55 | Diode | 1N458 |
| 56 | Resistor | 47K ohm |
| 57 | Transistor | 2N1309 |
| 58 | Resistor | 750 ohm |
| 59 | Resistor | 25K ohm (selected for size) |
| 60 | Resistor | 39K ohm |
| 61 | Capacitor | 0.47 microfarad |
| 62 | Transistor | 2N1613 |
| 63 | Resistor | 330K ohm |
| 64 | Resistor | 30K ohm, 1% |
| 65 | Resistor | 30K ohm, 1% |

| | | |
|---|---|---|
| 66 | Resistor | 47K ohm |
| 67 | Transistor | 2N1442 |
| 68 | Capacitor | 0.1 microfarad |
| 69 | Capacitor | 0.2 microfarad |
| 69a | Capacitor | 0.2 microfarad |
| 70 | Capacitor | 0.0068 microfarad |
| 71 | Resistor | 100K ohm |
| 72 | Resistor | selected for centering |
| 73 | Resistor | 1 Megohm |
| 74 | Resistor | 1 Megohm |
| 75 | Resistor | selected for centering |
| 76 | Resistor | 100K ohm |
| 77 | Resistor | 180 ohm |
| 78 | Resistor | 1K ohm |
| 79 | Resistor | 1K ohm |
| 80 | Resistor | 10K ohm |
| 81 | Resistor | 15K ohm |
| 82 | Capacitor | 22 microfarad/30volt |
| 83 | Capacitor | 22 microfarad/30 volt |
| 84 | Transistor | 2N1305 |
| 85 | Capacitor | 1200 micromicrofarad |
| 86 | Resistor | 47K ohm (approximately) |
| 87 | Resistor | 1K ohm |
| 88 | Diode | 1N458 |
| 89 | Resistor | 4.7K ohm |
| 90 | Transistor | 2N1305 |
| 91 | Resistor | 1.8K ohm |
| 92 | Diode | HD 4021 |
| 93 | Resistor | 390 ohm |
| 94 | Resistor | 25K ohm (selected for size) |
| 95 | Capacitor | 0.0015 microfarad |
| 96 | Resistor | 39K ohm |
| 97 | Transistor | 2N657 |
| 98 | Resistor | 30K ohm, 1% |
| 99 | Resistor | 33K ohm, 1% |
| 100 | Resistor | 39 K ohm |
| 101 | Transistor | 2N1442 |
| 102 | Capacitor | 470 micro-microfarad |
| 103 | Capacitor | 0.2 microfarad |
| 103a | Capacitor | 0.2 microfarad |
| 104 | Resistor | 100K ohm |
| 105 | Resistor | selected for centering |
| 106 | Resistor | 1 Megohm |
| 107 | Resistor | 1 Megohm |
| 108 | Resistor | selected for centering |
| 109 | Resistor | 100K ohm |
| 110 | Resistor | 330K ohm |
| 111 | Diode | 1N458 |
| 111a | Diode | 1N458 |
| 112 | Resistor | 20K ohm |
| 113 | Transistor | 2N1309 |
| 114 | Resistor | 330K ohm |
| 115 | Transistor | 2N1309 |
| 116 | Resistor | 10K ohm |
| 117 | Capacitor | 0.0033 microfarad |
| 118 | Transistor | 2N1442 |
| 119 | Resistor | 10K ohm |
| 120 | Resistor | 20K ohm |
| 121 | Resistor | 680 ohm |
| 122 | Resistor | 13 Megohm, 1/10 watt (Dep. Carbon) |
| 123 | Resistor | 13 Megohm, 1/10 watt (Dep. Carbon) |
| 124 | Capacitor | 0.002 microfarad |
| 125 | Capacitor | 0.002 microfarad |
| 126 | Capacitor | 15 microfarad/30 volt |
| 127 | Resistor | 10K ohm, 1/10 watt Dep. Carbon |
| 128 | Resistor | 33K ohm, 1/10 watt Dep. Carbon |
| 129 | Resistor | 120K ohm, 1/10 watt Dep. Carbon |
| 130 | Capacitor | 15 microfarad/30 volt |
| 131 | Resistor | 12K ohm, 1/10 watt Dep. Carbon |
| 132 | Transistor | PADT 28 or PADT 30 |
| 133 | Resistor | 12K ohm, 1/10 watt Dep. Carbon |
| 134 | Resistor | 4.3K ohm, 1/10 watt, Dep. Carbon |
| 135 | Transistor | 2N384 |
| 136 | Capacitor | 4.7 microfarad |
| 137 | Resistor | 1K ohm |
| 138 | Capacitor | 33 micro-microfarad |
| 139 | Resistor | 470 ohm |
| 140 | Resistor | 33 Kohm, 1/10 watt |
| 141 | Resistor | 12K ohm, 1/10 watt |
| 142 | Capacitor | 15 microfarad/30 volt |
| 143 | Resistor | 2.4K ohm, 1/10 watt |
| 144 | Resistor | 16K ohm, 1/10 watt |
| 145 | Capacitor | 15 microfarad/30 volt |
| 146 | Resistor | 1.8K ohm, 1/10 watt |
| 147 | Transistor | 2N384 |
| 148 | Capacitor | 12 micro-microfarad |
| 149 | Transistor | 2N384 |
| 150 | Capacitor | 4.7 microfarad/30 volt |
| 151 | Resistor | 1K ohm, 1/10 watt |
| 152 | Resistor | 7.5K ohm, 1/10 watt |
| 153 | Resistor | 4.7K ohm, 1/10 watt |
| 154 | Diode | 1N458 |
| 155 | Transistor | 2N384 |
| 156 | Resistor | 3.3K ohm, 1/10 watt |
| 157 | Capacitor | 15 microfarad/30 volt |
| 158 | Capacitor | 15 microfarad/30 volt |
| 159 | Resistor | 820 ohm, 1/10 watt |
| 160 | Capacitor | 5 micro-microfarad |
| 161 | Resistor | 180 ohm, 1/10 watt |
| 162 | Resistor | 180 ohm, 1/10 watt |
| 163 | Transistor | 2N384 |
| 164 | Transistor | 2N1613 |
| 165 | Capacitor | 47 micro-microfarad |
| 166 | Resistor | 820 ohm, 1/10 watt |
| 167 | Capacitor | 68 microfarad/30 volt |
| 168 | Resistor | 18K ohm, 3% |
| 169 | Resistor | 15K ohm, 3% |
| 170 | Resistor | 2.5K ohm |
| 171 | Resistor | 4.7K ohm, 3% |
| 172 | Resistor | 4.7K ohm, 2 watt |
| 173 | Capacitor | 0.47 microfarad |
| 174 | Capacitor | 0.47 microfarad |
| 175 | Capacitor | 0.47 microfarad |
| 176 | Capacitor | 0.1 microfarad |

The time-base generator 12 output is sinusoidal which eliminates video interference experienced with squarewave oscillators. The resonant circuit in the generator output allows impedance matching to the Incremag and a very simple method of synchronizing the count of two.

The preferred embodiment achieves operational requirements of better than 5percent linearity, good temperature stability, and minimal electrostatic pickup on long deflection voltage leads.

Linearity was achieved as follows: first, to avoid excessive rest time in the horizontal sweep the reset pulse to the horizontal integrator 17 was shaped so that reset occurs rapidly. Next, linearization was incorporated in the vertical sweep by providing a large time constant in the R-C coupling to the deflection plates $V_1$ and $V_2$, and feeding some of the phase inverter 15 output back to the integrator 14 input to compensate for the coupling network droop.

The amplifier 11 provides a minimum of 6 Megacycle bandwidth at 0.3 volt peak-to-peak output into 91 ohm cable. The signal to noise ratio is approximately 37 db (peak-to-peak vidicon signal versus rms input noise current). The output stage comprises a complimentary symmetry pair which provides the needed output level with linearity.

In resumé, the camera operation is as follows; the vidicon tube electron beam, guided by horizontal and vertical electrostatic deflection plates $H_1H_2$ and $V_1V_2$ traces the image receiving surface of the tube 10. When the electron beam strikes a portion of the surface charged positive from exposure to light an electrical current results. The current is amplified and fed to a monitor 20 for viewing.

One of the horizontal plates $H_2$ placed on each side of the vidicon tube, and one of the vertical deflection plates $V_2$ placed above and below, receive a saw-tooth voltage from respective integrated output one-shot multivibrators. Each of the other plates $H_1$ and $V_1$, respectively, receives the same voltage phase inverted. A time-base generator 12 is provided to supply enabling pulses to each multivibrator 13 and 16. During retrace the vidicon 10 is blanked by a blanking circuit 19.

What is claimed is:

1. A television camera comprising:

a vidicon tube having grids and an electron beam;

q video amplifier connected to the output of said vidicon having a plurality of two pole stages wherein the first stage includes first and second transistors and the output of said vidicon is coupled to the base of said first transistor, the collector of said first transistor is coupled to the base of said second transistor, and the output of the first stage is provided at the emitter of said second transistor: and means for electrostatically controlling said electron beam, wherein said means is an electrostatic deflection system including, a vertical deflection plate circuit for vertically sweeping and retracing said beam, a horizontal deflection plate circuit for horizontally sweeping and retracing said beam, a time-base generator operatively connected to said vertical circuit and said horizontal circuit for providing separate enabling pulses to said vertical circuit and said horizontal circuit, a blanking circuit operatively connected to said vertical circuit, said horizontal circuit, and said vidicon for unblanking said vidicon during sweep so that failure of either vertical or horizontal sweep results in continued blanking, and a direct-current potential supply operatively connected to said vidicon for supplying voltages to said grids, wherein said vertical circuit comprises, a first and a second vertical deflection plate, an integrator operatively connected to said second vertical plate for supplying a saw-tooth voltage to said second vertical plate, a unity-gain phase inverter operatively connected to said first vertical plate for supplying said saw-tooth voltage, phase inverted, to said first vertical plate and a one-shot multivibrator operatively connected to said integrator and said time-base generator for supplying a signal to said integrator to reset said integrator.

2. A television camera comprising:

a vidicon tube having grids and an electron beam;

a video amplifier connected to the output of said vidicon having a plurality of two pole stages wherein the first stage includes first and second transistors and the output of said vidicon is coupled to the base of said first transistor, the collector of said first transistor is coupled to the base of said second transistor, and the output of the first stage is provided at the emitter of said second transistor; and means for electrostatically controlling said electron beam, wherein said means is an electrostatic deflection system including, a vertical deflection plate circuit for vertically sweeping and retracing said beam, a horizontal deflection plate circuit for horizontally sweeping and retracing said beam, a time-base generator operatively connected to said vertical circuit and said horizontal circuit for providing separate enabling pulses to said vertical circuit and said horizontal circuit, a blanking circuit operatively connected to said vertical circuit, said horizontal circuit, and said vidicon for unblanking said vidicon during sweep so that failure of either vertical or horizontal sweep results in continued blanking, and a direct-current potential supply operatively connected to said vidicon for supplying voltages to said grids, wherein said horizontal deflection plate circuit comprises, a first and second horizontal deflection plate, an integrator operatively connected to said second horizontal plate for supplying saw-tooth voltage to said second horizontal plate, a unity-gain phase inverter operatively connected to said saw-tooth voltage, phase inverted, to said first horizontal plate, and a one-shot multivibrator operatively connected to said integrator and said time-base generator for supplying a signal to said integrator to reset said integrator.

3. A television camera comprising:

a vidicon tube having grids and an electron beam;

a video amplifier connected to the output of said vidicon having a plurality of two pole stages wherein the first stage includes first and second transistors and the output of said vidicon is coupled to the base of said first transistor the collector of said first transistor is coupled to the base of said second transistor, and the output of the first stage is provided at the emitter of said second transistor; the second stage includes third and fourth transistors wherein the output of said first stage is coupled to the base of the third transistor, the collector of said third transistor is coupled to the base of the fourth transistor, and the output of the second stage is provided at the emitter of said fourth transistor; and, the third stage includes fifth, sixth, and seventh transistors wherein the output of said second stage is coupled to the base of said fifth transistor, the collector of said fifth transistor is coupled to the bases of said sixth and seventh transistors, and the emitters of said sixth and seventh transistors are direct coupled; and means for electrostatically controlling said electron beam.

* * * * *